(12) United States Patent
Hoffmeyer et al.

(10) Patent No.: US 10,018,127 B2
(45) Date of Patent: Jul. 10, 2018

(54) METHOD AND DEVICE FOR ADJUSTING A VOLUMETRIC EFFICIENCY AND A CHARGE DENSITY IN AN INTERNAL COMBUSTION ENGINE

(71) Applicant: VOLKSWAGEN AKTIENGESELLSCHAFT, Wolfsburg (DE)

(72) Inventors: Henrik Hoffmeyer, Hannover (DE); Nils Lindenkamp, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 331 days.

(21) Appl. No.: 14/604,665

(22) Filed: Jan. 23, 2015

(65) Prior Publication Data

US 2015/0134230 A1    May 14, 2015

Related U.S. Application Data

(63) Continuation of application No. PCT/EP2013/064662, filed on Jul. 11, 2013.

(30) Foreign Application Priority Data

Jul. 25, 2012    (DE) .................. 10 2012 014 713

(51) Int. Cl.
*F02D 41/00*    (2006.01)
*F01L 13/00*    (2006.01)
(Continued)

(52) U.S. Cl.
CPC ...... *F02D 41/0007* (2013.01); *F01L 13/0015* (2013.01); *F02D 13/0238* (2013.01);
(Continued)

(58) Field of Classification Search
CPC .............. F01L 13/0015; F02D 13/0238; F02D 13/0269; F02D 15/00; F02D 2041/001;
(Continued)

(56) References Cited

U.S. PATENT DOCUMENTS 5,123,246 A * 6/1992 Younessi ................. F02B 37/22
                                                    60/602
6,510,691 B1 * 1/2003 Schmid .................... F02D 23/00
                                                    60/602
(Continued)

FOREIGN PATENT DOCUMENTS

DE    10046449 A1    3/2002
DE    10159801 A1    4/2003
(Continued)

OTHER PUBLICATIONS

170209 DE102004061110A1 google translate.pdf.*
(Continued)

*Primary Examiner* — David Hamaoui
*Assistant Examiner* — Carl Staubach
(74) *Attorney, Agent, or Firm* — Manfred Beck, P.A.

(57) ABSTRACT

A method for operating an internal combustion engine is provided. The internal combustion engine has a compressor for adjusting a charge density in an intake pipe of the internal combustion engine and has an adjusting device, such as a variable valve gear, for adjusting a volumetric efficiency of the internal combustion engine. A dynamic setpoint quantity for the internal combustion engine is determined as a function of a difference between a load demand upon the internal combustion engine and a current load output of the internal combustion engine. The volumetric efficiency and the charge density are adjusted as a function of the dynamic setpoint quantity. An internal combustion engine and a vehicle are also provided.

13 Claims, 4 Drawing Sheets

(51) Int. Cl.
*F02D 13/02* (2006.01)
*F02D 15/00* (2006.01)
*F02M 26/22* (2016.01)

(52) U.S. Cl.
CPC ......... *F02D 13/0269* (2013.01); *F02D 15/00* (2013.01); *F02D 41/0002* (2013.01); *F02D 2041/001* (2013.01); *F02M 26/22* (2016.02); *Y02T 10/12* (2013.01); *Y02T 10/142* (2013.01); *Y02T 10/42* (2013.01)

(58) Field of Classification Search
CPC . F02D 41/0002; F02D 41/0007; F02M 26/22; Y02T 10/142; Y02T 10/42
See application file for complete search history.

(56) References Cited

U.S. PATENT DOCUMENTS

| | | | | |
|---|---|---|---|---|
| 7,036,471 | B2* | 5/2006 | Minami | F01L 1/34 123/399 |
| 7,748,217 | B2* | 7/2010 | Muller | F02D 41/0007 60/600 |
| 8,312,850 | B1* | 11/2012 | Braman | F01L 1/143 123/90.16 |
| 2002/0059917 | A1 | 5/2002 | Kalweit et al. | |
| 2002/0162535 | A1* | 11/2002 | MacHida | F01L 1/34 123/406.45 |
| 2004/0006986 | A1* | 1/2004 | Baeuerle | F01L 1/34 60/601 |
| 2008/0098734 | A1* | 5/2008 | Olsson | F02B 37/12 60/605.1 |
| 2009/0107142 | A1* | 4/2009 | Russell | F02B 33/40 60/608 |
| 2009/0173319 | A1* | 7/2009 | Koch | F02B 47/08 123/568.12 |
| 2010/0242471 | A1 | 9/2010 | Tomoda et al. | |

FOREIGN PATENT DOCUMENTS

| | | |
|---|---|---|
| DE | 10233256 A1 | 2/2004 |
| DE | 102004061110 A1 | 6/2006 |
| DE | 102006024005 B3 | 8/2007 |
| EP | 2041414 B1 | 6/2010 |
| JP | 2004183511 A | 7/2004 |
| JP | 2009138733 A | 6/2009 |
| WO | 2006/022449 A1 | 3/2006 |

OTHER PUBLICATIONS

Search Report issued by the German Patent and Trademark Office for German Patent Application No. DE 10 2012 014 713.9, dated Mar. 18, 2013.
International Search Report for International Application No. PCT/EP2013/064662 and translation thereof, dated Nov. 11, 2013.
International Preliminary Report on Patentability for International Application No. PCT/EP2013/064662 including Written Opinion of the International Searching Authority and translation thereof, dated Jan. 27, 2015.

* cited by examiner

METHOD AND DEVICE FOR ADJUSTING A VOLUMETRIC EFFICIENCY AND A CHARGE DENSITY IN AN INTERNAL COMBUSTION ENGINE

CROSS-REFERENCE TO RELATED APPLICATIONS

This application is a continuation, under 35 U.S.C. § 120, of copending International Application No. PCT/EP20131064662, filed Jul. 11, 2013, which designated the United States; this application also claims the priority, under 35 U.S.C. § 119, of German Patent Application No. 10 2012 014 713.9, filed Jul. 25, 2012; the prior applications are herewith incorporated by reference in their entirety.

BACKGROUND OF THE INVENTION

Field of the Invention

The invention relates to a method for operating an internal combustion engine. The invention also relates to an internal combustion engine and to a vehicle having an internal combustion engine.

In Otto engines, which for example can be used in passenger motor vehicles or trucks, the thermodynamic efficiency is limited on account of the necessary throttling of the quantitative load control and also on account of the reduced compression ratio for avoiding engine knocking. The so-called "Miller/Atkinson processes" represent one approach for de-throttling during partial load operation and for possible increase of the geometric compression ratio. In this case, via an early/late closing of the inlet valves (EIVC=early inlet valve closing, (LIVC=late inlet valve closing), the air consumption and the effective compression are reduced. As a result, the engine can be de-throttled and the final compression temperature and therefore the knocking tendency can be reduced or the geometric compression can be increased. By applying the high-compression Miller combustion method, the air consumption of the engine is reduced and it needs a higher charging pressure with comparable power. This can lead to a reduced dynamic response of the charging unit. With the available valve gear variabilities, the internal combustion engine can theoretically also be operated "throttle free", however, i.e. without a throttle valve adjustment. From this, it follows that the internal combustion engine is to be controlled via the air consumption. The air consumption describes the ratio of air mass which is put through the engine to the possible air mass determined on the basis of a thermodynamic state in the intake pipe.

In this context, a method for operating an Otto engine is known from European Patent Document EP 2041414 B1 In the method, an inlet valve of the Otto engine is closed very early or very late and the combustion air which is fed to the engine is compressed through the use of a charger. The very early or very late closing of the inlet valve in conjunction with an increased geometric compression ratio compared with the charged normal operation creates a reduction of the temperature level with increased thermodynamic efficiency. The filling of the cylinders which is reduced as a result of the closing times of the inlet valves is at least approximately compensated by the compression of the combustion air flow through the use of the charger so that an adequate power output level is available. As a further measure for temperature reduction, a partial flow of discharged exhaust gas is fed back as exhaust gas recirculation to the combustion air flow at least at full load.

German Patent Application DE 10 159 801 A1 relates to an internal combustion engine with at least one charging unit which is driven by the exhaust gas flow of the internal combustion engine, and with a camshaft which is adjustable according to the Miller combustion process, wherein an additional compressor stage, which is not activated by the exhaust flow of the internal combustion engine, is arranged in series or in parallel with the charging unit. At low rotational speeds of the internal combustion engine, the charging pressure is increased by activating the additional compressor stage.

German Patent Application DE 10 233 256 A1 relates to a method for igniting a fuel-air mixture in an Otto engine with direct fuel injection with a prechamber and spark ignition in the prechamber. The prechamber is in functional communication with a small piston recess. The possibility also exists, by a specific change of the valve timings, of undertaking an adaptation to different requirements, wherein a later time point for the exhaust valve closing especially serves for fuel proportions, which find their way into the exhaust gas duct as a result of the injection during the push-out stroke, being pushed back into the combustion chamber again as a result of an "internal" exhaust gas recirculation and therefore being combusted during the conversion of the mixture in the main combustion chamber so that there is no efficiency loss of the engine.

SUMMARY OF THE INVENTION

It is accordingly an object of the invention to provide a method for operating an internal combustion engine which overcomes the disadvantages of the heretofore-known methods of this general type. It is in particular an object of the invention to provide an improved operating strategy for a high-compression, charged Otto engine according to the Miller combustion process.

With the foregoing and other objects in view there is provided, in accordance with the invention, a method for operating an internal combustion engine, wherein the method includes:

providing an internal combustion engine having a compressor for adjusting a charge density in an intake pipe of the internal combustion engine and having an adjusting device for adjusting a volumetric efficiency of the internal combustion engine;

determining a dynamic setpoint quantity for the internal combustion engine as a function of a difference between a load demand upon the internal combustion engine and a current load output of the internal combustion engine; and adjusting the volumetric efficiency and the charge density as a function of the dynamic setpoint quantity.

In other words, according to the invention, there is provided a method for operating an internal combustion engine, wherein the internal combustion engine includes a compressor for adjusting a charge density (p_SGR) in an intake pipe of the internal combustion engine and includes an adjusting device for adjusting a volumetric efficiency ($\lambda$_I) of the internal combustion engine, wherein the method includes determining a dynamic setpoint quantity (rl_dyn) for the internal combustion engine in dependence on a difference between a load demand (rl_soll) upon the internal combustion engine and a current load output (rl_ist) of the internal combustion engine, and adjusting the volumetric efficiency ($\lambda\_I$) and the charge density (p_SGR) in dependence on the dynamic setpoint quantity (rl_dyn).

Thus, according to the present invention, a method for operating an internal combustion engine is provided. The internal combustion engine includes a compressor for adjusting a charge density in an intake pipe of the internal combustion engine and an adjusting device for adjusting a volumetric efficiency of the internal combustion engine. The adjusting device can include for example a variable valve gear which for example has a discrete valve lift curve switchover or a continuous variability and/or an inlet side and exhaust side phase adjustment. In the method, a dynamic setpoint quantity for the internal combustion engine is determined as a function of a difference between a load demand upon the internal combustion engine—which for example is given via an accelerator pedal—and a current load output of the internal combustion engine. The volumetric efficiency and the charge density are adjusted as a function of the dynamic setpoint quantity. By adjusting the volumetric efficiency, the internal combustion engine can be operated in a de-throttled state. By both the volumetric efficiency and the charge density being used as reference quantities for the load adjustment and therefore torque control of the internal combustion engine, a wider parameter space is provided for load control. As a result, the dynamic response of the internal combustion engine and/or the efficiency of the internal combustion engine can be improved.

According to a mode of the invention, the step of adjusting of the volumetric efficiency and the charge density includes adjusting the volumetric efficiency as a function of the dynamic setpoint quantity; and adjusting the charge density as a function of the dynamic setpoint quantity and of the adjusted volumetric efficiency.

In other words, according to a mode of the invention, the adjusting of the volumetric efficiency and the charge density includes adjusting the volumetric efficiency ($\lambda\_I$) as a function of the dynamic setpoint quantity (rl_dyn), and adjusting the charge density (p_SGR) as a function of the dynamic setpoint quantity (rl_dyn) and of the adjusted volumetric efficiency ($\lambda\_I$).

Thus, according to an embodiment, the volumetric efficiency is adjusted as a function of the dynamic setpoint quantity and the charge density is adjusted as a function of the dynamic setpoint quantity and the adjusted volumetric efficiency. Since the dead time or reaction time of the compressor, i.e. the time until the compressor sets a required charge density in the intake pipe of the internal combustion engine, is greater than the dead time of the adjusting device for adjusting the volumetric efficiency (variable valve gear), the volumetric efficiency control is the leading controller and the control of the charge density is the following controller. As a result, a high dynamic response of the internal combustion engine in the event of changing load requirements and an efficiency-optimum state, especially in the case of quasi-stationary conditions, can be achieved.

A further mode of the invention includes providing the adjusting device as configured to also adjust a residual gas proportion in a cylinder filling of the internal combustion engine; adjusting the residual gas proportion as a function of the dynamic setpoint quantity; and adjusting the charge density as a function of the dynamic setpoint quantity, of the adjusted volumetric efficiency and of an adjusted residual gas proportion.

In other words, the adjusting device is also configured for adjusting a residual gas proportion (x_r) in a cylinder filling of the internal combustion engine, wherein the method further includes adjusting the residual gas proportion (x_r) as a function of the dynamic setpoint quantity (rl_dyn), and adjusting the charge density (p_SGR) as a function of the dynamic setpoint quantity (rl_dyn), of the adjusted volumetric efficiency ($\lambda\_I$) and of the adjusted residual gas proportion (x_r).

Thus, according to a further embodiment, a residual gas proportion in a cylinder filling of the internal combustion engine (internal exhaust gas recirculation) can also be adjusted via the adjusting device (the variable valve gear). The residual gas proportion is adjusted as a function of the dynamic setpoint quantity and the charge density is adjusted as a function of the dynamic setpoint quantity, the adjusted volumetric efficiency and the adjusted residual gas proportion. Since again a dead time for changing the adjusted residual gas proportion is shorter than a dead time for changing the charge density, the residual gas proportion control is the leading controller and the control of the charge density is the follow-up controller.

According to another mode of the invention, the step of determining of the dynamic setpoint quantity includes determining the dynamic setpoint quantity as a function of a difference between the load demand upon the internal combustion engine and the current load output of the internal combustion engine and as a function of a time change of the load demand. In other words, the determining of the dynamic setpoint quantity (rl_dyn) includes determining the dynamic setpoint quantity (rl_dyn) as a function of a difference between the load demand (rl_soll) upon the internal combustion engine and the current load output (rl_ist) of the internal combustion engine and as a function of a time change (f_dyn) of the load demand.

Thus, according to a further embodiment, the dynamic setpoint quantity is determined as a function of a difference between the load demand upon the internal combustion engine and the current load output of the internal combustion engine and as a function of a time change of the load demand. The time change (temporal change) of the load demand can include for example a signal change speed of the valuator (pedal sensor) of the accelerator pedal of the vehicle. By the time change of the load demand also being recorded and taken into consideration during the adjustment of the volumetric efficiency and of the charge density, a driving behavior desired by a driver of the vehicle can be reproduced and realized in line with demand with regard to the drive dynamics of the internal combustion engine.

According to another mode of the invention, the internal combustion engine includes an Otto engine with a geometric compression ratio in a range of 12:1 to 15:1 and the internal combustion engine is controlled in accordance with a Miller combustion process.

Thus, according to a further embodiment, the internal combustion engine includes an Otto engine which has a geometric compression ratio in the range of 12:1 to 15:1. Such an internal combustion engine is also referred to as a high-compression internal combustion engine. The high-compression internal combustion engine is operated according to the Miller combustion process. By operating the internal combustion engine according to the Miller combustion process, a knocking tendency of the engine can be reduced and therefore power and durability of the internal combustion engine can be improved.

According to yet another mode of the invention, the adjusting device for adjusting the volumetric efficiency includes a variable valve gear, and the adjusting of the volumetric efficiency includes determining an adjustment range of a valve lift of the variable valve gear as a function of the current load output; determining an adjustment range of a phase angle of an inlet camshaft of the variable valve gear as a function of the current load output; determining an adjustment range of a phase angle of an exhaust camshaft of the variable valve gear as a function of the current load output; and adjusting the valve lift, the phase angle of the inlet camshaft and the phase angle of the exhaust camshaft as a function of the dynamic setpoint quantity within the respective determined adjustment ranges.

In other words, in accordance with a mode of the invention, the adjusting device includes a variable valve gear for adjusting the volumetric efficiency, wherein the adjusting of the volumetric efficiency ($\lambda\_I$) includes determining an adjustment range of a valve lift (EW) of the variable valve gear as a function of the current load output (rl_ist); determining an adjustment range of a phase angle (wnwe) of an inlet camshaft of the variable valve gear as a function of the current load output (rl_ist); determining an adjustment range of a phase angle (wnwa) of an exhaust camshaft of the variable valve gear as a function of the current load output (rl_ist); and determining the valve lift (EW), the phase angle (wnwe) of the inlet camshaft and the phase angle (wnwa) of the exhaust camshaft as a function of the dynamic setpoint quantity (rl_dyn) within the respective determined adjustment ranges.

Thus, according to yet another embodiment, for adjusting the volumetric efficiency an adjustment range of a valve lift of the variable valve gear is first of all determined as a function of the current load output. Also, an adjustment range of a phase angle of an inlet camshaft of the variable valve gear is determined as a function of the current load output and an adjustment range of a phase angle of an exhaust camshaft of the variable valve gear is determined as a function of the current load output. The valve lift, the phase angle of the inlet camshaft and the phase angle of the exhaust camshaft are adjusted as a function of the dynamic setpoint quantity within the respective determined adjustment ranges. By the currently possible adjustment ranges of the variable valve gear being first of all determined, a so-called reserve-oriented control strategy of the torque control of the internal combustion engine can be conducted. In other words, depending on the demanded load change and the demanded load change dynamics the variable valve gear can be adjusted as a function of a current load state of the internal combustion engine in such a way that the desired load change is realized as requested with a dynamic which is as high as possible or rather in an efficiency-optimized and therefore economical manner.

According to yet a further mode of the invention, the compressor is driven by an exhaust gas turbine of the internal combustion engine with a variable turbine geometry, and the adjusting of the charge density includes determining an adjustment range of the variable turbine geometry as a function of the current load output; and adjusting the variable turbine geometry as a function of the dynamic setpoint quantity within a determined adjustment range.

In other words, in accordance with a mode of the invention, the compressor is driven by an exhaust gas turbine of the internal combustion engine with variable turbine geometry (VTG), wherein the adjusting of the charge density (p_SGR) includes determining an adjustment range of the variable turbine geometry (VTG) as a function of the current load output (rl_ist); and adjusting the variable turbine geometry (VTG) as a function of the dynamic setpoint quantity (rl_dyn) within the determined adjustment range.

Thus, according to an embodiment, the compressor is driven by an exhaust-gas turbine of the internal combustion engine with variable turbine geometry. For adjusting the charge density, an adjustment range of the variable turbine geometry is determined as a function of the current load output and the variable turbine geometry is adjusted as a function of the dynamic setpoint quantity within the thereby determined adjustment range. By changing the variable turbine geometry, an adjustment speed of a desired charge density can be changed. As a result, via the adjustment of the turbine geometry a fast change of the load and torque output of the internal combustion engine or an improved level of efficiency can be achieved.

With the objects of the invention in view there is also provided, an engine configuration, including:

an internal combustion engine having an intake pipe, a compressor for adjusting a charge density in the intake pipe, an adjusting device for adjusting a volumetric efficiency of the internal combustion engine, and a control device; and the control device being configured to determine a dynamic setpoint quantity for the internal combustion engine as a function of a difference between a load demand upon the internal combustion engine and a current load output of the internal combustion engine and to adjust the volumetric efficiency and the charge density as a function of the dynamic setpoint quantity.

In other words, in accordance with the invention, there is also provided an internal combustion engine including a compressor for adjusting a charge density (p_SGR) in an intake pipe of the internal combustion engine; an adjusting device for adjusting a volumetric efficiency ($\lambda\_I$) of the internal combustion engine; and a control device which is configured to determine a dynamic setpoint quantity (rl_dyn) for the internal combustion engine as a function of a difference between a load demand (rl_soll) upon the internal combustion engine and a current load output (rl_ist) of the internal combustion engine and to adjust the volumetric efficiency ($\lambda\_I$ and the charge density (p_SGR) as a function of the dynamic setpoint quantity (rl_dyn).

Thus, according to the present invention, provision is furthermore made for an internal combustion engine which includes a compressor for adjusting a charge density in an intake pipe of the internal combustion engine, an adjusting device for adjusting a volumetric efficiency of the internal combustion engine and a control device. The control device is able to determine a dynamic setpoint quantity for the internal combustion engine as a function of a difference between a load demand upon the internal combustion engine and a current load output of the internal combustion engine and to adjust the volumetric efficiency and the charge density as a function of the dynamic setpoint quantity. By adjusting both the volumetric efficiency and the charge density for implementation of a load change, both a dynamic response of the internal combustion engine and a level of efficiency of the internal combustion engine can be improved. A reaction speed of the internal combustion engine to the load change, especially to an increasing load demand, is what is understood by the dynamic response of the internal combustion engine in relation to the present invention.

According to a feature of the invention, the control device is configured to adjust the volumetric efficiency as a function of the dynamic setpoint quantity and to adjust the charge density as a function of the dynamic setpoint quantity and of an adjusted volumetric efficiency.

According to another feature of the invention, the adjusting device is configured to also adjust a residual gas proportion in a cylinder filling of the internal combustion engine as a function of the dynamic setpoint quantity; and the control device is configured to adjust the charge density as a function of the dynamic setpoint quantity, of the adjusted volumetric efficiency and of an adjusted residual gas proportion.

According to yet another feature of the invention, the control device is configured to determine the dynamic setpoint quantity as a function of a difference between the load demand upon the internal combustion engine and the current load output of the internal combustion engine and as a function of a time change (temporal change) of the load demand.

According to another feature of the invention, the internal combustion engine includes an Otto engine with a geometric compression ratio in a range of 12:1 to 15:1 and the internal combustion engine is controlled in accordance with a Miller combustion process. The invention is in particular concerned with a method for operating a charged, high-compression Otto engine which has a variable valve setting, a so-called variable valve gear, and which is operated according to the Miller combustion process.

According to a further feature of the invention, the adjusting device for adjusting the volumetric efficiency includes a variable valve gear having an inlet camshaft and an exhaust camshaft; and the control device is configured to adjust the volumetric efficiency by determining an adjustment range of a valve lift of the variable valve gear as a function of the current load output, by determining an adjustment range of a phase angle of the inlet camshaft of the variable valve gear as a function of the current load output, by determining an adjustment range of a phase angle of the exhaust camshaft of the variable valve gear as a function of the current load output, and by adjusting the valve lift, the phase angle of the inlet camshaft and the phase angle of the exhaust camshaft as a function of the dynamic setpoint quantity within respective determined adjustment ranges.

According to another feature of the invention, the internal combustion engine includes an exhaust gas turbine with a variable turbine geometry; the compressor is driven by the exhaust gas turbine; and the control device is configured to adjust the charge density by determining an adjustment range of the variable turbine geometry as a function of the current load output and by adjusting the variable turbine geometry as a function of the dynamic setpoint quantity within a determined adjustment range.

The internal combustion engine can be configured for implementing the previously described method or one of its embodiments and therefore also includes the advantages which are described in relation to the method.

According to the present invention, a vehicle with the previously described internal combustion engine is finally provided.

With the objects of the invention in view there is therefore also provided, a vehicle including:

an internal combustion engine having an intake pipe, a compressor for adjusting a charge density in the intake pipe, an adjusting device for adjusting a volumetric efficiency of the internal combustion engine, and a control device; and the control device being configured to determine a dynamic setpoint quantity for the internal combustion engine as a function of a difference between a load demand upon the internal combustion engine and a current load output of the internal combustion engine and to adjust the volumetric efficiency and the charge density as a function of the dynamic setpoint quantity.

Other features which are considered as characteristic for the invention are set forth in the appended claims.

Although the invention is illustrated and described herein as embodied in a method for operating an internal combustion engine and embodied in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
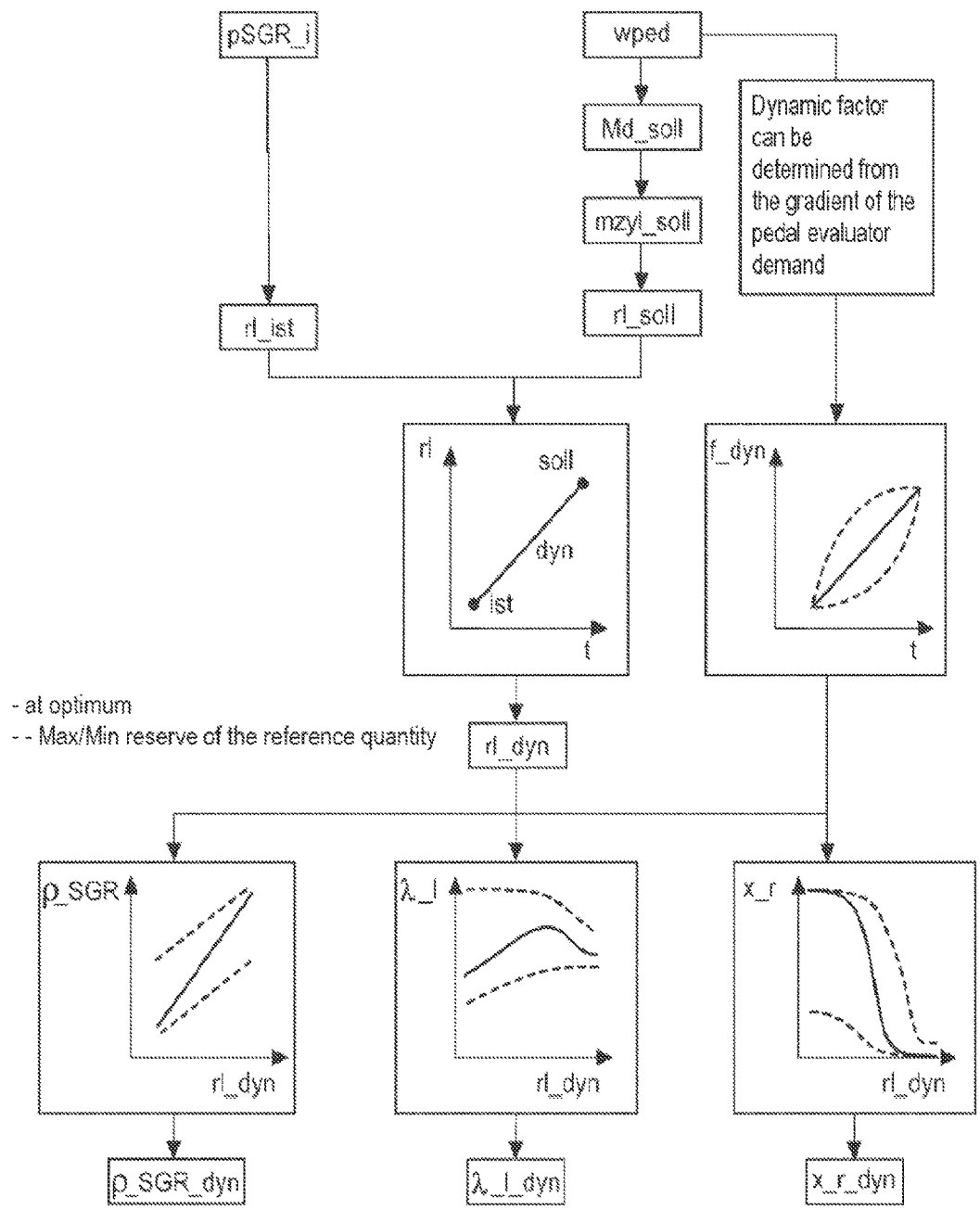
FIG. 1 is a chart illustrating a setpoint quantity determination for an internal combustion engine according to an embodiment of the invention.

In conventional Otto engines, the thermodynamic efficiency, on account of the necessary throttling of the quantitative load control and also of the reduced compression ratio, is limited for avoiding engine knocking. The so-called Miller or Atkinson process therefore represents one approach for de-throttling in the partial load operation and for the possible increase of the geometric compression ratio. In this case, via an early or, respectively, late closing of the inlet valve the volumetric efficiency and the effective compression are reduced. As a result, the engine is de-throttled and the compression temperature and therefore the knocking tendency are reduced or, respectively, the geometric compression is increased. The volumetric efficiency, which describes the ratio of air mass trapped in the cylinder to the theoretical air mass in the cylinder determined on the basis of a thermodynamic state in the intake pipe (intake manifold) downstream of a possible charge-air cooler, can be reduced through the use of the Miller process for example from 0.95 to between 0.6 and 0.8. On account of the reduced volumetric efficiency, a power loss can occur, however. In order to avoid this power loss and to still achieve the efficiency increase through the use of the Miller process, the internal combustion engine can be operated with an exhaust gas turbocharger (ATL), especially an exhaust gas turbocharger with variable turbine geometry. In the event of dynamic load changes, the dead time, however, which the turbocharger requires in order to provide a requested charge density, i.e. a requested intake pipe pressure, can lead to a delay of the desired power output change of the internal combustion engine. The combination of charging and increased compression ratio (Miller process) requires the use of valve gear variabilities and also suitable operating and control strategies. In addition, the influence of external exhaust gas recirculation (EGR) is to be considered in this case. Before the controlling according to the invention of the internal combustion engine in the event of dynamic load changes is dealt with, the operating strategy of the steady-state types of operation of a high-compression, charged Otto engine according to the Miller process is briefly described below.

The following operating strategies can be used for example in the following types of operation.

Low Partial Load Operation:

During low partial load operation, the aim is a maximum de-throttling of the entire system while observing the smooth running limits. To this end, the charge exchange is conducted in such a way, that a maximum proportion of internal residual gas is adjusted while taking into consideration the smooth running limits. This is carried out by advancing the opening of the inlet valves and by retarding the closing of the exhaust valves. Moreover, via a possible valve lift variability and a throttle valve, an optimum mixed throttling made up of valve lift and throttle valve actuation is set with regard to the charge exchange work so that a slight intake pipe negative pressure is established in order to ensure a sufficient crankcase ventilation.

Medium partial load operation up to induction-based full load:

For load increase, a further de-throttling of the engine by opening of the throttle valve and, if possible, by increasing the volumetric efficiency by increasing the valve lift is carried out in this load range. Furthermore, the exhaust valve camshaft is advanced in order to reduce the internal residual gas content and to replace it with fresh air.

High-load operation up to full load:

On account of the necessity of the reduced volumetric efficiency for reducing the effective compression ratio and therefore for avoiding engine knocking, an increase of the charging pressure through the use of the available charging unit is already necessary after a moderate relative load rl (definition: air expenditure with regard to standard conditions in percentage terms). In addition, by feed of external cooled exhaust gas recirculation (eEGR) the knocking tendency on the one hand and the wall heat losses on the other hand can be reduced. It is therefore necessary to produce an optimum regarding ignition angle retardation for avoiding engine knocking by reducing the effective compression ratio by reducing the volumetric efficiency, charge pressure demand for compensation in the volumetric efficiency reduction and external EGR for thermal optimization of the high pressure process. Based on the induction-based full load, an activation of the charging unit is carried out. This is dependent upon the respective efficiency concept of the charging unit. For further load increase, the volumetric efficiency is continuously increased while optimizing the charge exchange efficiency. The volumetric efficiency can additionally be increased via the valve lift so that the opening and closing of the inlet valve can be decoupled in a controlled manner. Alternatively, this can also be carried out via a fast inlet phase adjuster in case of discrete valve lift correction. In this case, an ignition angle retardation on account of possible engine knocking can be permitted since the advantage as a result of the lower charge exchange losses on account of the higher volumetric efficiency is greater than the disadvantage in the high-pressure loop as a result of the ignition angle retardation. This relationship changes, however, if positions of the centers of combustion have to be set later than approximately 16 to 20° crankshaft angle after top dead center of the ignition. This limit is a function of rotational speed and efficiency characteristics of the charging unit. For further load increase, the volumetric efficiency and therefore the effective compression ratio can be limited via the time point of the closing of the inlet valves. A further load increase can be carried out by increasing the charge density through the use of the charging unit, by a reduction of the external exhaust gas recirculation rate and by a retardation of the closing of the exhaust valves in combination with a positive scavenging gradient. As a result, an improved scavenging of the hot and knocking iendency-increasing internal residual gas is carried out. For this purpose, an exhaust gas turbocharger with variable turbine geometry or a mechanically or electrically driven additional compressor can especially be used. The aim is to minimize the internal residual gas proportions. With increasing engine rotational speed and therefore increasing mass flow, the maximum activation of the turbocharger is shifted to lower levels of activation in order to constantly set an optimum ratio of intake pipe pressure and exhaust-gas back pressure.

The previously described operating strategy for a charged, high compression Otto engine with valve gear variabilities results in a widened possible parameter space for load control. In general, it is true that the engine torque is directly proportional to the fresh air mass $m_{l,zyl}$ trapped in the cylinder. The following is therefore applicable:

$$M_d \sim m_{l,Zyl} = \lambda_l \cdot V_h \cdot \rho_{SGR} = \lambda_l \cdot V_h \cdot \frac{p_{SGR}}{R_{SGR} * T_{SGR}} \quad (1)$$

with:

$\lambda_l$ Volumetric efficiency
$V_h$ Swept volume of a cylinder
$\rho$ Density
$p$ Pressure
$R$ Gas constant
$T$ Temperature
Index SGR Intake pipe In conventional internal combustion engines, the volumetric efficiency and the internal residual gas proportion are gathered from the predetermined valve timings and vary in a range of approximately 0.9 to 105. Through the use of a variable valve gear, the volumetric efficiency can theoretically be varied from approximately 0.1 to 1.05 and furthermore the internal residual gas proportion can be actively adjusted. According to the principle of the Miller process, the efficiency influences not only the filling of the cylinder, but also the knocking tendency and therefore the producible torque and the achievable efficiency of the internal combustion engine. From this, it follows that for a charged, high-compression Otto engine according to the Miller process the volumetric efficiency of the fresh air filling and the intake pipe pressure have to be set according to the equation (1) for each operating state in an operation-optimum relationship. Derived from the setpoint filling with fresh air mass is a setpoint volumetric efficiency, a setpoint charge density and a setpoint residual gas proportion. The setpoint volumetric efficiency and the setpoint residual gas proportion are adjusted through the use of the valve gear variability. The setpoint charge density is adjusted through the use of the throttle valve and/or an adjustment valve of the charging unit. The volumetric efficiency is essentially inversely proportional to the intake pipe density or, respectively, to the intake pipe pressure. From this, it follows two controllers, which are dependent upon each other, control towards a target quantity, specifically the fresh air filling.

FIG. 1 shows a schematic sequence of a setpoint quantity determination for the available controllers of the load control. Based on a driver's desire wped, which is detected via the accelerator pedal, the determination of a setpoint torque Md_soll and, taking into consideration the levels of efficiency inside the engine, the determination of a setpoint fresh air filling mzyl_soll are carried out. This setpoint fresh air filling, depending on the operating state, is converted into a relative setpoint load rl_soll from which are derived the setpoint values of the reference quantities of the available load controllers. In parallel with this, the current load rl_ist of the internal combustion engine is determined from the current intake pipe pressure pSGR_ist. The dynamic factor rl_dyn is determined from the difference between current relative load rl_ist and relative setpoint load rl_soll. In the case of a high-compression, charged Otto engine according to the Miller process, these are, by way of example, the charge density in the intake pipe $\rho\_SGR$, the volumetric efficiency $\lambda\_l$ and the residual gas proportion x_r. The intake pipe density $\rho\_SGR$ can by way of example be adjusted through the use of a throttle valve or a control valve of the charging unit (turbocharger) that is used. The volumetric efficiency $\lambda\_l$ and the residual gas proportion x_r can be adjusted via a valve gear variability. The valve gear variability can be realized for example through the use of a continuously adjustable center-symmetrical inlet valve lift via an operation of an eccentric shaft and also via a phase adjustment of the inlet and exhaust camshaft. A subordinated coordination of these three controllers is carried out, which controllers adjust the setpoint reference quantities by coordinated positioning by pre-control (pilot control) and control (dosed loop control) of the closing of the exhaust valve via the exhaust camshaft phase controller and also by pre-control and control of the opening and closing of the inlet valve via the inlet camshaft phase controller and the valve lift controller. By determining a dynamic factor f_dyn from the speed of the accelerator pedal adjustment, a dynamic influencing of the setpoint quantities volumetric efficiency $\lambda\_l$ and residual gas proportion x_r, moreover, is carried out. This is carried out through the use of a reserve-oriented guidance of the control reference quantities described below.

In conventional Otto engines, a driver's desired torque is determined on the basis of the accelerator pedal position. From this, a setpoint cylinder filling is carried out, whereupon all the thermodynamic relevant engine controllers, such as throttle valve, camshaft phase controller and charge pressure controller, are adjusted to this setpoint cylinder filling in accordance with a pre-control. On account of the reduced volumetric efficiency for reducing engine knocking and the dependency of the dynamic response of the filling build-up associated therewith especially as a result of the charging unit, this strategy of the reference quantity leads to large dynamic and efficiency losses during an operation of a charged, high-compression Otto engine according to the Miller process.

Figure 2:
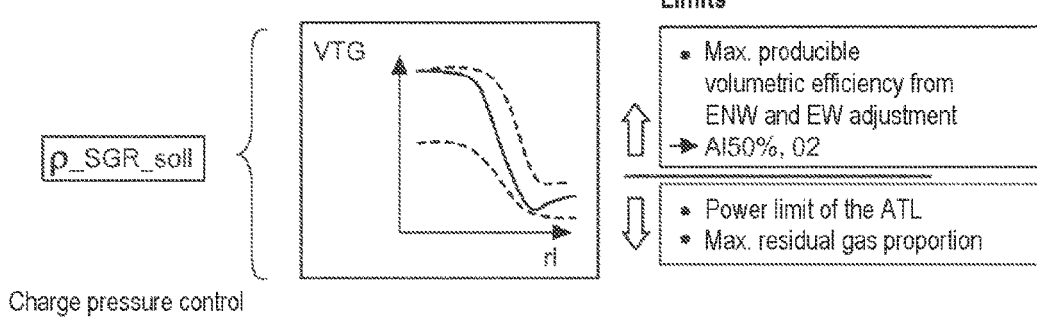
FIG. 2 is an illustration that shows in an exemplary manner a controller reserve of a variable turbine geometry for an internal combustion engine according to an embodiment of the invention.
Figure 3:
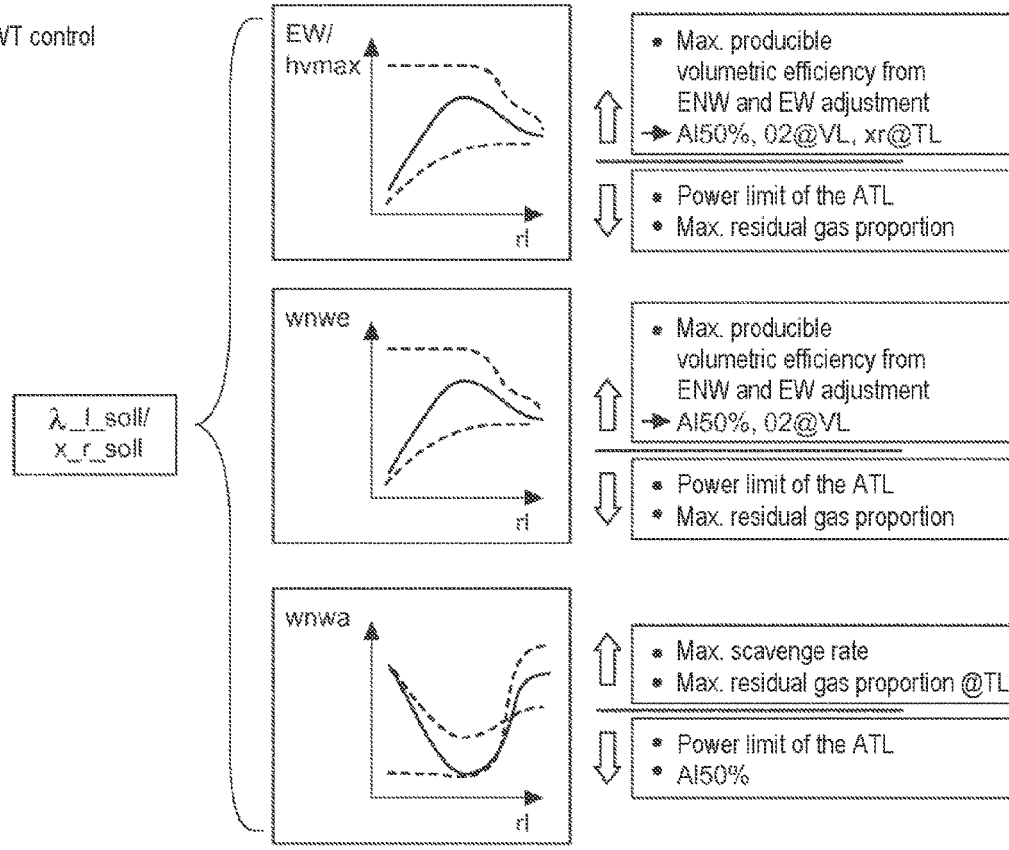
FIG. 3 is an illustration that shows in an exemplary manner different controller reserves of a variable valve gear depending on the engine load for an internal combustion engine according to an embodiment of the invention.

Therefore, a vectorial guidance of the setpoint quantity "cylinder fresh air filling" is used for improving the response behavior. The dynamic setpoint quantity rl_dyn, which is determined as a function of the momentarily retrievable volumetric efficiency and charge density build-up, is defined as a function of the difference between relative setpoint load rl_soll and relative actual load rl_ist. In this case, a dead time of the actuating elements for changing the volumetric efficiency and the charge density build-up is taken into consideration, which is why the volumetric efficiency control is always the leading controller and the control of the charge density is the follow-up controller. To this end, a reserve-oriented data input of the described dependencies of the setpoint reference quantities and the limiting quantity of the available controllers are determined and used as a basis for a reserve-oriented control strategy for pre-control and control of the engine torque. This can be determined for example through the use of an artificial neural network or a physical modeling. The reference quantities setpoint volumetric efficiency, setpoint charge density and setpoint residual gas proportion can be expressed in terms of data or modeled taking into consideration the center point positions achievable in the case of predetermined knocking limits and also the running smoothness. FIGS. 2 and 3 show corresponding controller reserves as a function of the load rl at a constant rotational speed. The adjustment range of a turbocharger with variable turbine geometry (VTG), which determines the setpoint intake pipe density $\rho\_SGR\_soll$, results from the maximum producible volumetric efficiency from the inlet camshaft adjustment (ENW) and the eccentric shaft adjustment (EW) of a mechanical valve gear, which is therefore representative for a valve lift, from a crankshaft angle of the 50% energy conversion point (Al 50%), from an oxygen concentration in the exhaust gas (O2), from a power limit of the exhaust gas turbocharger, and also from a maximum residual gas proportion. The fully variable valve gear control (VVT-control) controls the setpoint volumetric efficiency $\lambda\_l\_soll$ and the setpoint residual gas rate x_r_soll. The controllers which can be influenced are the eccentric shaft (EW), which determines the maximum valve lift of the variable valve gear (hvmax), the phase angle of the inlet camshaft relative to the charge exchange top dead center position (wnwe) and the phase angle of the exhaust camshaft relative to the charge exchange top dead center position (wnwa). The additional abbreviations used in FIG. 3 mean:

O2@VL: oxygen concentration in the exhaust gas at full load, xr@TL: residual gas rate at partial load.

The dashed lines in the diagrams of FIGS. 2 and 3 indicate in each case the possible adjustment range of the corresponding controller at a given constant rotational speed depending on the relative load rl.

Figure 4:
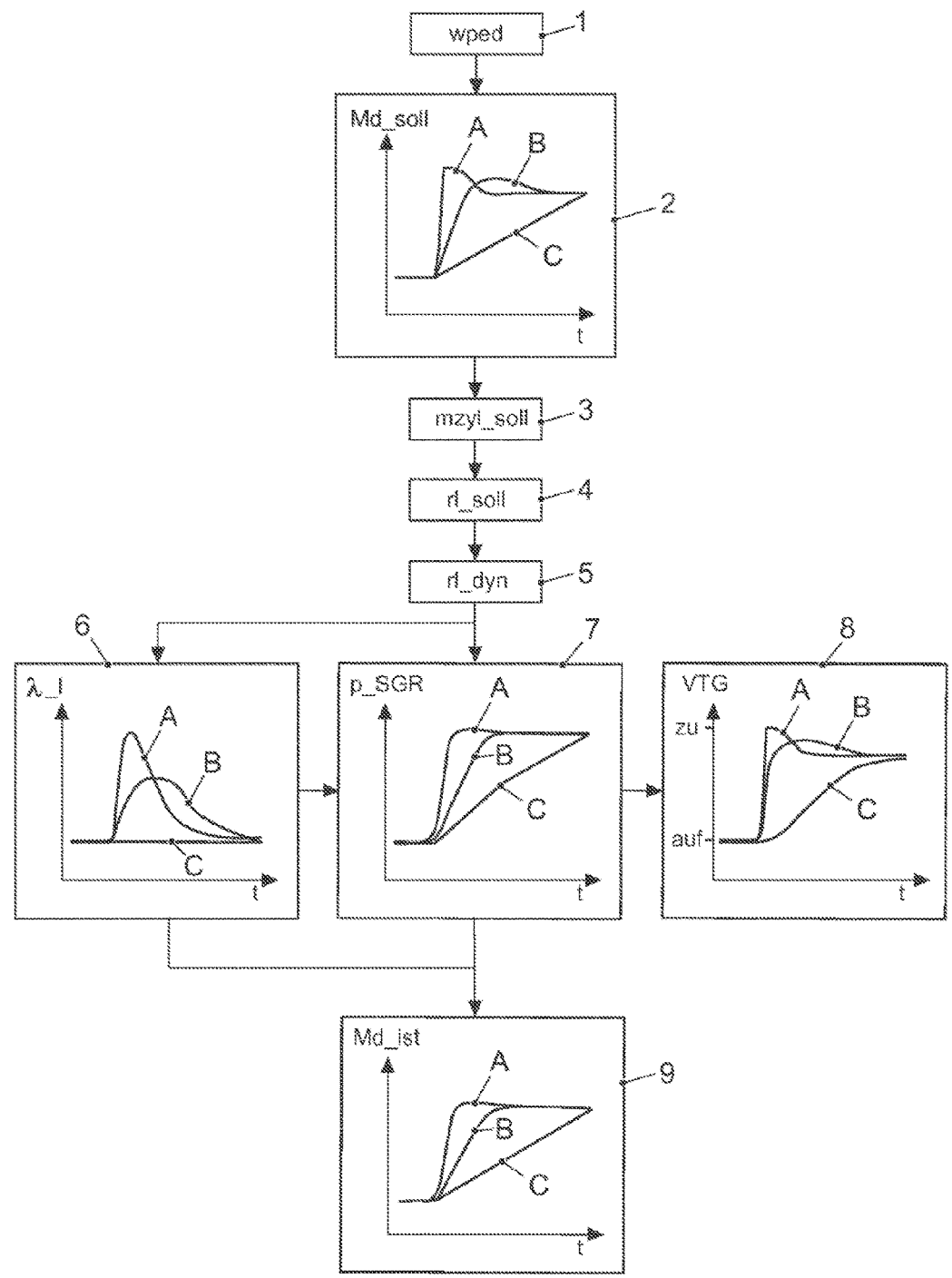
FIG. 4 is a chart illustrating in a schematic manner a reserve-oriented control strategy according to an embodiment of the invention.

The operating strategy previously described with reference to FIG. 1, especially the reserve-oriented guidance strategy of the torque control, is described below with reference to FIG. 4 based on the example of three load jumps. In this case, three different cases A, B and C are assumed, in which cases a driver of the vehicle demands the respective load change with a different dynamic response via the accelerator pedal. In step 1, the load change demanded by the driver is detected via the accelerator pedal wped. Shown in diagram 2 are corresponding graphs A, B, C for the cases A, B, C. In graph A, the driver desires the maximum available acceleration and it then levels out at a constantly high torque Md_soll. In graph B, the targeted torque is the same as in graph A, but the demand for the dynamic response or, respectively, the torque build-up is significantly less, i.e. the driver depresses the accelerator pedal with a reduced speed. Graph C shows a demand for an efficiency-optimum torque characteristic. The targeted torque of graphs A, B, C in diagram 2 is the same in each case, As was previously described with reference to FIG. 1, a cylinder setpoint filling mzyl_soll is determined from the setpoint torque Md_soll in step 3 and from this a relative setpoint load rl_soll is determined in step 4. Taking into consideration the dynamic response of the accelerator pedal movement of graphs A, B and C, a setpoint value for the dynamic air filling in the cylinder rl_dyn is determined in step 5. Diagrams 6, 7 and 8 show the adjustment derived from this for the volumetric efficiency $\lambda\_l$, the intake pipe pressure p_SGR, which corresponds to the charge density, and the variable turbine geometry VTG of an exhaust gas turbocharger, which is determined from the intake pipe pressure p_SGR. In order to allow the torque to increase as quickly as possible in case A during the load jump, the valve gear (fast controller) is adjusted via inlet phase and/or valve lift so that the maximum possible volumetric efficiency is achieved from the reserve-oriented filling data input in conjunction with FIG. 3. At the same time, the variable turbine geometry (slow controller) is changed in order to increase the charge pressure. By increasing the volumetric efficiency and the charge pressure, the filling of the engine is maximized and a fast increase of the torque Md_ist ensues, as is shown by graph A in diagram 9. In case B, which demands a moderate load jump, the volumetric efficiency is increased via the valve gear noticeably less sharply in comparison with case A. The variable turbine geometry is altered at the same time in order to be able to increase the charge pressure as quickly as possible. Overall, a slower load jump thus ensues in comparison to case A, but as a result of which a significantly better level of efficiency can also be achieved. In case C, the demanded torque increase over time is so low such that the volumetric efficiency can always be adjusted in an efficiency-optimum manner. In the case of a high-compression Miller combustion process, the volumetric efficiency can therefore remain at a low level, as is shown via graph C in diagram 6. The torque increase can be controlled in this case solely via the increase of the intake pipe density $\rho\_SGR$ by the adjustment of the variable turbine geometry VTG of the exhaust gas turbocharger, i.e. only via the slower actuating element. As a result, an efficiency-optimum operation of the internal combustion engine can be achieved.

Figure 5:
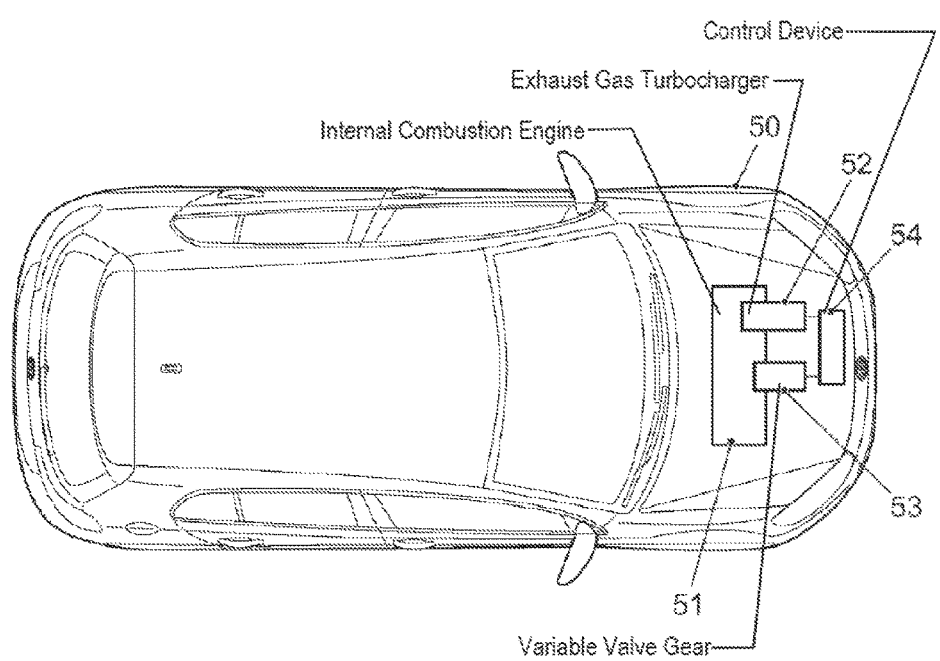
FIG. 5 is a schematic view of a vehicle according to an embodiment of the invention.

In conclusion, FIG. 5 shows a vehicle 50 with an internal combustion engine 51. The internal combustion engine 51 includes an exhaust gas turbocharger 52 with a variable turbine geometry and a variable valve gear 53. The internal combustion engine 51 furthermore includes a control device 54 which is configured to determine a dynamic setpoint quantity for the internal combustion engine 51 as a function of a difference between a load demand, from for example a driver of the vehicle, upon the internal combustion engine 51 and a current load output of the internal combustion engine 51. The control device 54 is also configured to adjust the volumetric efficiency via the variable valve gear 53 and the charge density via the exhaust gas turbocharger 52 as a function of the dynamic setpoint quantity.

What is claimed is:

1. A method for operating an internal combustion engine, the method comprising:
   determining a dynamic setpoint quantity for the internal combustion engine as a function of a difference between a load demand upon the internal combustion engine and a current load output of the internal combustion engine;
   determining an adjustment range of a valve lift of a variable valve gear as a function of the current load output, wherein the variable valve gear has one of discrete valve lift curves and a continuously variable valve lift curve and wherein the variable valve gear has an inlet side and exhaust side phase adjustment;
   determining an adjustment range of a phase angle of an inlet camshaft of the variable valve gear as a function of the current load output;
   determining an adjustment range of a phase angle of an exhaust camshaft of the variable valve gear as a function of the current load output; and
   adjusting a volumetric efficiency of the internal combustion engine and a charge density in an intake pipe of the internal combustion engine as a function of the dynamic setpoint quantity, wherein the variable valve gear adjusts the volumetric efficiency of the internal combustion engine by adjusting the valve lift, the phase angle of the inlet camshaft and the phase angle of the exhaust camshaft as a function of the dynamic setpoint quantity within respective determined adjustment ranges, and wherein a compressor adjusts the charge density in the intake pipe of the internal combustion engine.

2. The method according to claim 1, wherein the step of adjusting the volumetric efficiency and the charge density includes:
   adjusting the volumetric efficiency as a function of the dynamic setpoint quantity; and
   adjusting the charge density as a function of the dynamic setpoint quantity and of an adjusted volumetric efficiency.

3. The method according to claim 2, which comprises:
   adjusting a residual gas proportion in a cylinder filling of the internal combustion engine as a function of the dynamic setpoint quantity by using the variable valve gear; and
   adjusting the charge density as a function of the dynamic setpoint quantity, of the adjusted volumetric efficiency and of an adjusted residual gas proportion.

4. The method according to claim 1, wherein the step of determining the dynamic setpoint quantity includes:
   determining the dynamic setpoint quantity as a function of a difference between the load demand upon the internal combustion engine and the current load output of the internal combustion engine and as a function of a time change of the load demand.

5. The method according to claim 1, wherein the internal combustion engine includes an Otto engine with a geometric compression ratio in a range of 12:1 to 15:1 and wherein the internal combustion engine is controlled in accordance with a Miller combustion process.

6. The method according to claim 1, wherein the compressor is driven by an exhaust gas turbine of the internal combustion engine with a variable turbine geometry, and wherein the adjusting of the charge density includes:
   determining an adjustment range of the variable turbine geometry as a function of the current load output; and
   adjusting the variable turbine geometry as a function of the dynamic setpoint quantity within the adjustment range.

7. An engine configuration, comprising:
   an internal combustion engine having an intake pipe, a compressor for adjusting a charge density in said intake pipe, a variable valve gear for adjusting a volumetric efficiency of said internal combustion engine, and a control device;
   said control device being configured to determine a dynamic setpoint quantity for said internal combustion engine as a function of a difference between a load demand upon said internal combustion engine and a current load output of said internal combustion engine and to control an adjustment of the volumetric efficiency and the charge density as a function of the dynamic setpoint quantity;

said variable valve gear having an inlet camshaft and an exhaust camshaft, said variable valve gear having one of discrete valve lift curves and a continuously variable valve lift curve and said variable valve gear having an inlet side and exhaust side phase adjustment;

said control device determining an adjustment range of a valve lift of the variable valve gear as a function of the current load output;

said control device determining an adjustment range of a phase angle of said inlet camshaft of said variable valve gear as a function of the current load output;

said control device determining an adjustment range of a phase angle of said exhaust camshaft of said variable valve gear as a function of the current load output;

said variable valve gear adjusting the volumetric efficiency of the internal combustion engine by adjusting the valve lift, the phase angle of the inlet camshaft and the phase angle of the exhaust camshaft as a function of the dynamic setpoint quantity within respective determined adjustment ranges; and said compressor adjusting the charge density in said intake pipe of said internal combustion engine.

8. The engine configuration according to claim 7, wherein said control device is configured to adjust the volumetric efficiency as a function of the dynamic setpoint quantity and to adjust the charge density as a function of the dynamic setpoint quantity and of an adjusted volumetric efficiency.

9. The engine configuration according to claim 8, wherein:
said variable valve gear is configured to also adjust a residual gas proportion in a cylinder filling of said internal combustion engine as a function of the dynamic setpoint quantity; and
said control device is configured to adjust the charge density as a function of the dynamic setpoint quantity, of the adjusted volumetric efficiency and of an adjusted residual gas proportion.

10. The engine configuration according to claim 7, wherein said control device is configured to determine the dynamic setpoint quantity as a function of a difference between the load demand upon said internal combustion engine and the current load output of said internal combustion engine and as a function of a time change of the load demand.

11. The engine configuration according to claim 7, wherein said internal combustion engine includes an Otto engine with a geometric compression ratio in a range of 12:1 to 15:1 and wherein said internal combustion engine is controlled in accordance with a Miller combustion process.

12. The engine configuration according to claim 7, wherein:
said internal combustion engine includes an exhaust gas turbine with a variable turbine geometry;
said compressor is driven by said exhaust gas turbine; and
said control device is configured to adjust the charge density by determining an adjustment range of the variable turbine geometry as a function of the current load output and by adjusting the variable turbine geometry as a function of the dynamic setpoint quantity within the adjustment range.

13. A vehicle comprising:
an internal combustion engine having an intake pipe, a compressor for adjusting a charge density in said intake pipe, a variable valve gear for adjusting a volumetric efficiency of said internal combustion engine, and a control device;

said control device being configured to determine a dynamic setpoint quantity for said internal combustion engine as a function of a difference between a load demand upon said internal combustion engine and a current load output of said internal combustion engine and to control an adjustment of the volumetric efficiency and the charge density as a function of the dynamic setpoint quantity;

said variable valve gear having an inlet camshaft and an exhaust camshaft, said variable valve gear having one of discrete valve lift curves and a continuously variable valve lift curve and said variable valve gear having an inlet side and exhaust side phase adjustment;

said control device determining an adjustment range of a valve lift of the variable valve gear as a function of the current load output;

said control device determining an adjustment range of a phase angle of said inlet camshaft of said variable valve gear as a function of the current load output;

said control device determining an adjustment range of a phase angle of said exhaust camshaft of said variable valve gear as a function of the current load output;

said variable valve gear adjusting the volumetric efficiency of the internal combustion engine by adjusting the valve lift, the phase angle of the inlet camshaft and the phase angle of the exhaust camshaft as a function of the dynamic setpoint quantity within respective determined adjustment ranges; and said compressor adjusting the charge density in said intake pipe of said internal combustion engine.

* * * * *